United States Patent [19]
Swisher

[11] Patent Number: 6,029,763
[45] Date of Patent: Feb. 29, 2000

[54] WORM GEAR ASSEMBLY FOR A MEDICAL MOBILITY APPARATUS PERMITTING MANUAL REVERSE MOBILITY

[75] Inventor: Maurice E. Swisher, Bidwell, Ohio

[73] Assignee: Reliance Electric Industrial Company, Milwaukee, Wis.

[21] Appl. No.: 08/920,607

[22] Filed: Aug. 27, 1997

[51] Int. Cl.$^7$ ..................................................... B60K 1/00
[52] U.S. Cl. ..................... 180/65.6; 180/907; 280/250.1; 74/425
[58] Field of Search .................................. 180/907, 65.6, 180/65.1; 280/250.1, 304.1, 236, 237, 238; 475/7; 74/425, 416

[56] References Cited

U.S. PATENT DOCUMENTS

| | | | |
|---|---|---|---|
| 2,310,115 | 2/1943 | Popoff | 74/425 |
| 3,895,700 | 7/1975 | Kerr | 74/425 |
| 4,226,136 | 10/1980 | Porter | 74/416 |
| 5,042,315 | 8/1991 | Fahy et al. | 74/411 |
| 5,275,248 | 1/1994 | Finch et al. | 180/65.6 |
| 5,690,185 | 11/1997 | Sengel | 180/65.1 |

*Primary Examiner*—Christopher P. Ellis
*Attorney, Agent, or Firm*—David G. Luettgen; John J. Horn; John M. Miller

[57] ABSTRACT

A worm gear assembly for a medical mobility apparatus, such as a motorized wheelchair or scooter, comprises a worm and a worm gear. The worm is operatively coupled to a motor shaft of a drive motor of the medical mobility apparatus. The worm gear, which is disposed on an intermediate shaft, is adapted for being driven by the worm and is adapted for driving a drive wheel of the medical mobility apparatus. The worm gear and the worm have a gear ratio of less than 10:1 and the worm has a lead angle in the range of about 20–30°. This arrangement permits the worm gear to selectively drive the worm and permits manual reverse mobility of the medical mobility apparatus.

5 Claims, 4 Drawing Sheets

WORM GEAR ASSEMBLY FOR A MEDICAL MOBILITY APPARATUS PERMITTING MANUAL REVERSE MOBILITY

FIELD OF THE INVENTION

This invention relates to a worm gear assembly for a medical mobility apparatus, and more particularly relates to a worm gear assembly for a medical mobility apparatus which permits manual reverse mobility.

DESCRIPTION OF RELATED ART

Medical mobility apparatuses, such as motorized wheelchairs and scooters, are known for assisting mobility impaired individuals. A typical motorized wheelchair, for example, comprises two drive motors which are used to drive the wheelchair. Each drive motor is coupled a respective drive wheel by way of a respective gearbox assembly.

Most commercial gearbox assemblies used in motorized wheelchairs utilize skew-axis gearing. An example of this type of gearing is the Helicon® skew-axis gear assembly manufactured by Illinois Tool Works Inc. (ITW) of Glenview, Ill. The skew axis gear set has an 8.2:1 gear ratio, and the gearbox overall has an 18.06:1 gear ratio. While skew-axis gearbox assemblies work acceptably well, they are expensive to manufacture and therefore raise the overall cost of the motorized wheelchair.

Other, less expensive gearbox assemblies have also been used. For example, there has been provided a gearbox assembly which utilizes a worm gear set having a 12:1 gear ratio, and the gearbox overall has a 28.6:1 gear ratio. While this gearbox works acceptably well, it does not facilitate manual reverse mobility, i.e., the ability to manually move the motorized wheelchair in a reverse direction. Rather, the gearbox is self-locking under normal forces applied by the passenger or by the individual who is assisting the passenger.

Reverse mobility is an important feature affecting the commercial marketability of a motorized wheelchair. Nearly all motorized wheelchairs feature automated reverse mobility, in which the passenger is able to move the motorized wheelchair in a reverse direction through proper control of a joystick or other controller. Nevertheless, manual reverse mobility in a motorized wheelchair is also desirable in certain situations. For example, manual operation may be the only option available for moving the wheelchair (in either a forward direction or a reverse direction) if the batteries which drive the electric motors become discharged. Additionally, moving around tight corners and other tight spaces is difficult when controlling the wheelchair with a joystick, and manual operation allows more precise control of the wheelchair to be obtained. In these situations, it is desirable for the passenger, or for another individual who is assisting the passenger, to be able to move the wheelchair in a reverse direction.

Many motorized wheelchairs permit manual reverse mobility by way of a disengage lever which disengages using a disengage lever. The disengage lever disengages the gearbox so that the motor and gearbox do not present any resistance to the movement of the drive wheels in the reverse direction. However, use of a disengage lever is not always convenient or possible, and a wheelchair in which manual reverse mobility could be achieved without having to disengage the gearbox assembly would be highly desirable.

Therefore, what is needed is an alternative gearbox assembly for a medical mobility apparatus which facilitates manual reverse mobility. The gearbox assembly should make it possible for the passenger (or an individual who is assisting the passenger) to move the medical mobility apparatus in reverse without having to disengage the gearbox assembly.

SUMMARY OF THE INVENTION

The present invention provides an alternative gearbox assembly for a motorized wheel chair which facilitates manual reverse mobility and which makes it possible to move the wheelchair in reverse without having to disengage a gearbox assembly. The alternative gearbox assembly is a worm gear assembly comprising a worm and a worm gear. The worm is operatively coupled to a motor shaft of a drive motor of the medical mobility apparatus. The worm gear, which is disposed on an intermediate shaft, is adapted for being driven by the worm and is adapted for driving a drive wheel of the medical mobility apparatus. The worm gear and the worm have a gear ratio of less than 10:1 and the worm has a lead angle in the range of about 20–30°. This arrangement permits the worm gear to selectively drive the worm and permits manual reverse mobility of the medical mobility apparatus.

In a preferred embodiment, the efficiency of the worm and the worm gear is at least 90% when the worm is driving the worm gear at a speed of about 3000 RPM, the worm and the worm gear have a center distance in the range of about 1.0 inches to 1.5 inches, and the worm gear and the worm have a gear ratio of 8:1.

In a particularly preferred embodiment, the worm gear and the worm have a gear ratio of 8:1 and an operating center distance of 1.195 inches. Additionally, the worm has an axial pitch of 0.1460 inches, five threads, an outside diameter of a profile of 0.616 inches, a normal pressure angle of 20 degrees, a pitch diameter of 0.5313 inches, a lead angle of 23.62 degrees, a lead of 0.7299 inches, an addendum of 0.0426 inches, and a whole depth of 0.0957 inches, a root diameter of 0.425 inches. Finally, the worm gear has an axial pitch of 0.1460 inches, a pitch diameter of 1.859 inches, forty teeth, a normal pressure angle of 20 degrees, a whole depth of a tooth of 0.0957 inches, an outside diameter of a throat of 1.946 inches, and an outside diameter of 1.977 inches.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and in which.

DETAILED DESCRIPTION OF THE PREFERRED EMBODIMENT

Figure 1:
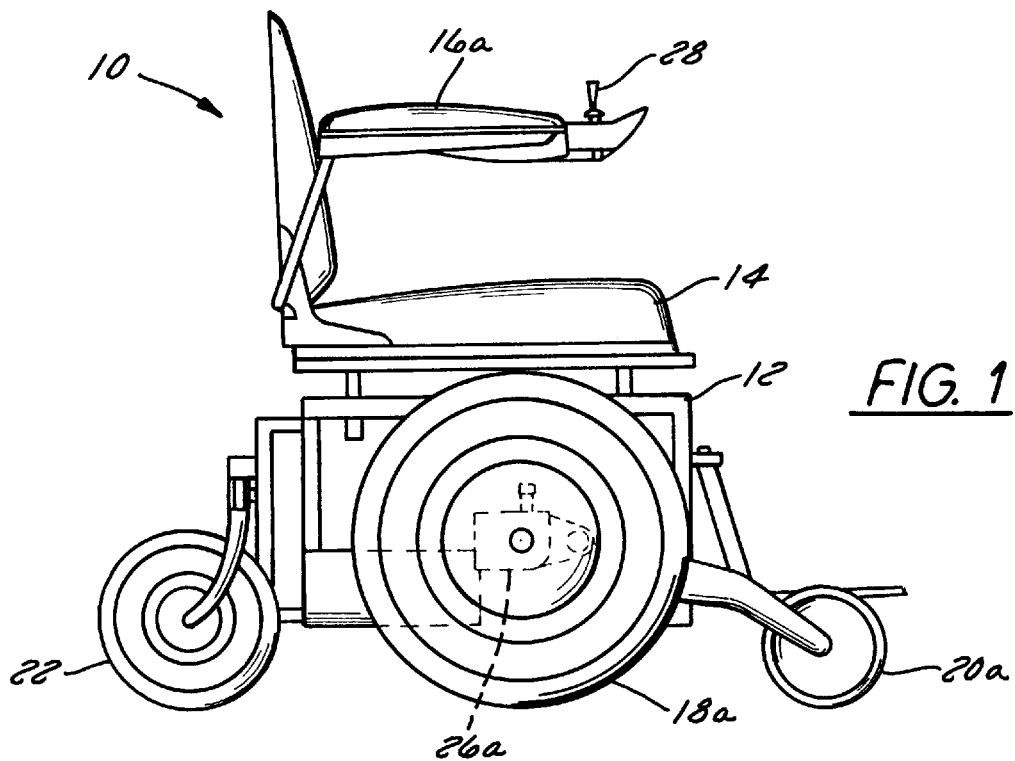
FIG. 1 is a side elevation view of a motorized wheelchair according to the present invention.
Figure 2:
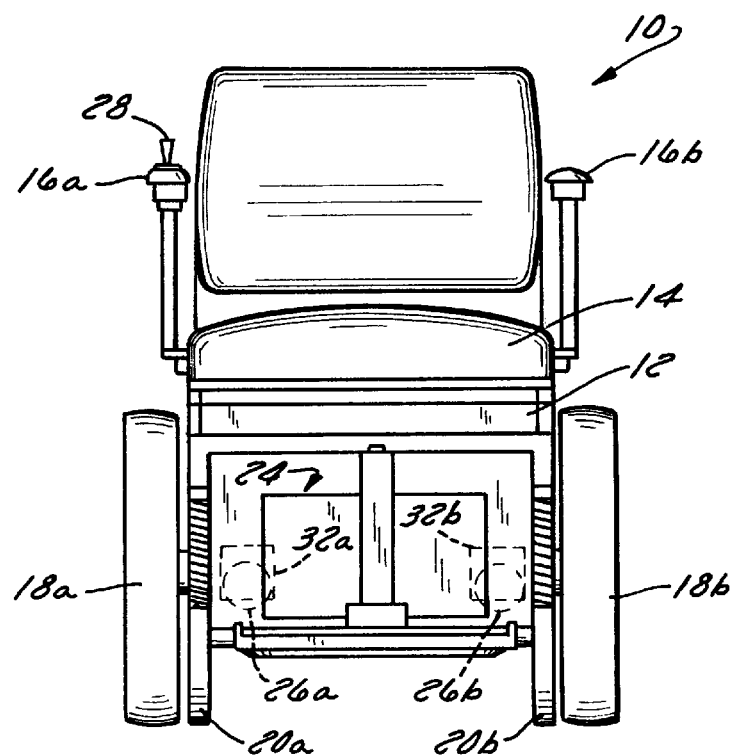
FIG. 2 is a front elevation view of a motorized wheelchair according to the present invention.

Referring now to FIGS. 1–2, a motorized wheelchair 10 according to present invention is illustrated. The motorized wheelchair 10 comprises a frame 12, a passenger seat 14, armrests 16a and 16b, and a plurality of wheels. The plurality of wheels include drive wheels 18a and 18b, front wheels 20a and 20b, and a rear stabilizer wheel 22.

The motorized wheelchair 10 also includes a drive system 24 which drives the drive wheels 18a and 18b. The drive system 24 includes electric motors 26a and 26b which are controlled by a controller such as a joystick 28. The motors 26a and 26b receive power from batteries 30a and 30b and are connected to respective drive wheels 18a and 18b by way of worm gear assemblies 32a and 32b.

Figure 3:
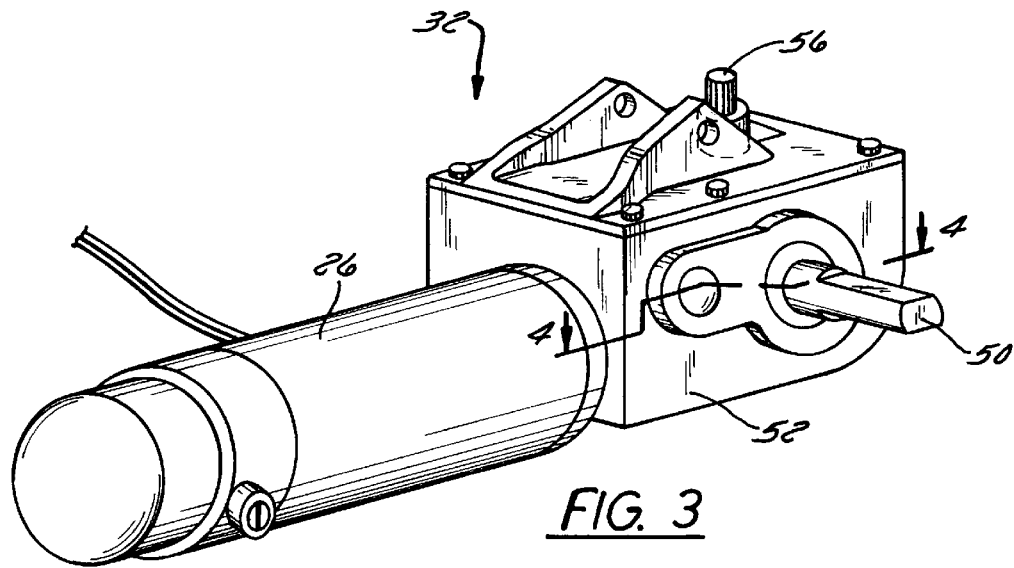
FIG. 3 is a perspective view of a worm gear assembly incorporated in a motorized wheelchair according to the present invention.
Figure 4:
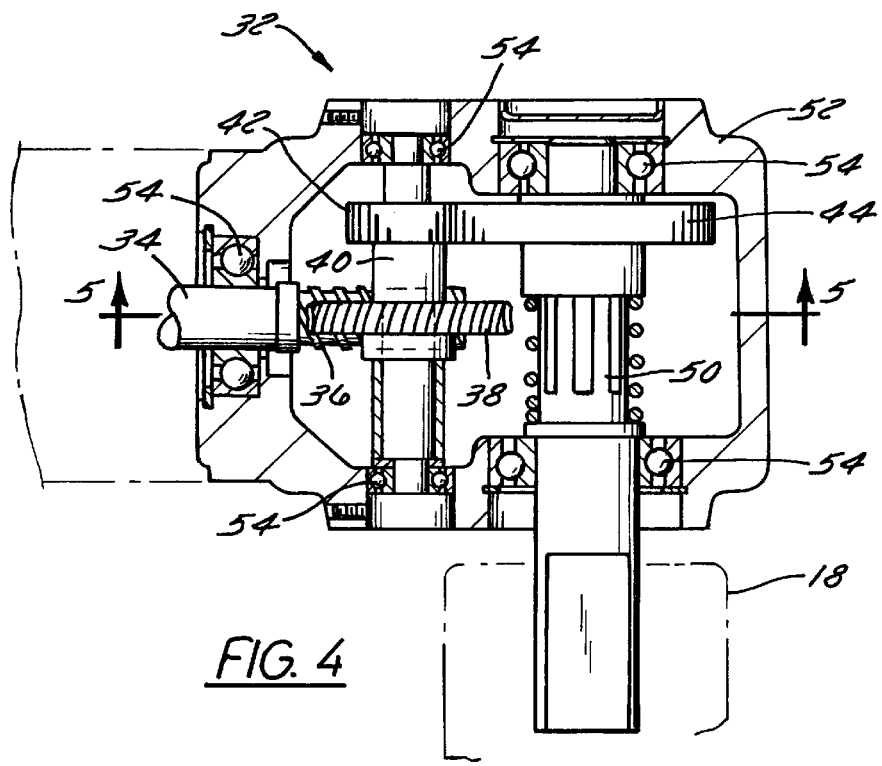
FIG. 4 is a sectional view taken along the lines 4—4 in FIG. 3.
Figure 5:
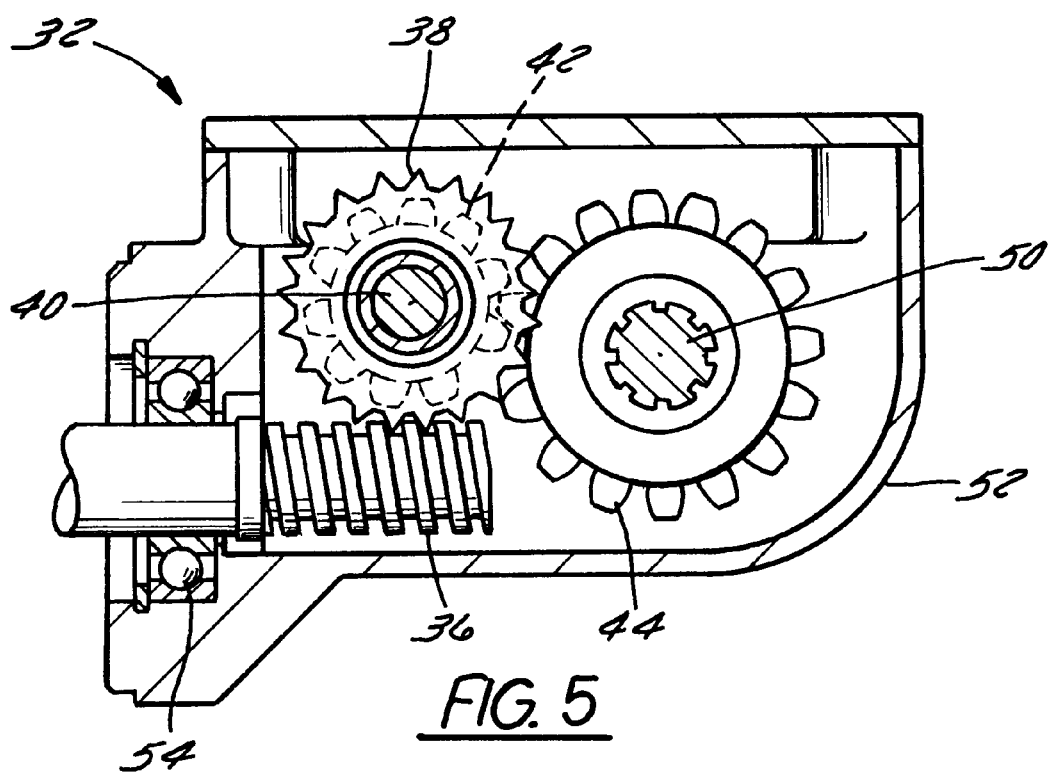
FIG. 5 is a side elevation view of a gearbox incorporated in a motorized wheelchair according to the present invention.

A worm gear assembly 32 is illustrated in greater detail in FIGS. 3–5. Preferably, the only difference between the worm gear assemblies 32a and 32b is that their respective drive shafts appear on opposite sides of their respective housings. Thus, the worm gear assembly 32 is intended to generically represent both the worm gear assembly 32a and the worm gear assembly 32b. (Similarly, the drive wheel 18 is intended to generically represent the drive wheels 18a and 18b, and the electric motor 26 is intended to generically represent the electric motors 26a and 26b).

The electric motor 26 has a motor output shaft 34 which terminates in (or is otherwise coupled to) a worm 36. The worm 36 drives a worm gear 38 which is mounted on an intermediate shaft 40. A spur gear 42 is also mounted on the intermediate shaft 40, and is driven by the shaft 40 when the worm 36 drives the worm gear 38. The spur gear 42 drives a second spur gear 44 which is mounted on a drive shaft 50. The drive shaft 50 mounts to the drive wheel 18 so that the drive wheel 18 is driven when the electric motor 26 drives the worm gear 38.

The shafts 40 and 50 are mounted within the worm gear assembly housing 52, which also includes ball bearings 54 to reduce friction. (The side of the housing 52 on which the drive shaft 50 appears and is coupled to the drive wheel 18 depends on whether the worm gear assembly is configured to operate as the worm gear assembly 32a or the worm gear assembly 32b.) A disengage lever 56 extends from the housing 52, and is used to selectively disengage the spur gear 44 from the spur gear 42. As previously described, the disengage lever 56 provides an alternative way to facilitate manual reverse mobility. However, depending on the individual and on the situation, use of the disengage lever 56 may not always be possible or convenient. In addition, some wheelchairs may not have disengage levers.

For this reason, the worm gear assembly 32 is configured so as to facilitate manual reverse mobility. Specifically, the worm gear assembly 32 makes it possible for the passenger (or an individual who is assisting the passenger) to manually move the motorized wheelchair 10 in reverse without having to actuate the disengage lever 56 to disengage the worm gear assembly 32.

Several aspects of the worm gear assembly 32 make it possible to facilitate reverse mobility in this manner, while still providing a worm gear assembly which is in other respects advantageous to use in conjunction with the motorized wheelchair 10. Namely, the worm gear assembly 32 has a lead angle which is relatively large (i.e., in a range of about 20–30°). The increased lead angle helps prevent the worm gear assembly 32 from being self-locking when the worm gear 38 attempts to drive the worm 36. Additionally, the worm 36 and the worm gear 38 have an efficiency which is preferably 90% or higher in the forward direction (when the worm 36 is driving the worm gear 38) at a speed of about 3000 RPM. Higher efficiency in the forward direction yields higher efficiency in the manual reverse direction (when the worm gear 38 is driving the worm 36), which in turn also helps prevent the worm gear assembly 32 from being self-locking when the worm gear 38 attempts to drive the worm 36. This higher efficiency is achievable through proper lubrication and precise tolerances of the worm 36 and the worm gear 38, in addition to the general design of the worm 36 and the worm gear 38 (see, e.g., Tables I and II below). Moreover, the worm gear assembly 32 has a center distance which is in a range of about 1.0" to 1.5". This center distance range allows the housing 52 to be relatively small and to not consume too much space within the motorized wheelchair 10. Finally, the worm gear 38 and the worm 36 have a gear ratio of less than about 10:1. Preferably, the worm gear 38 and the worm 36 have a gear ratio of about 8:1 so that, in combination with the gear ratio of the spur gears 42 and 44, the gear ratio of the overall worm gear assembly 32 is about 19:1. As a result, the electric motors 26a and 26b are able to impart a relatively high velocity to the motorized wheelchair 10.

Figure 6B:
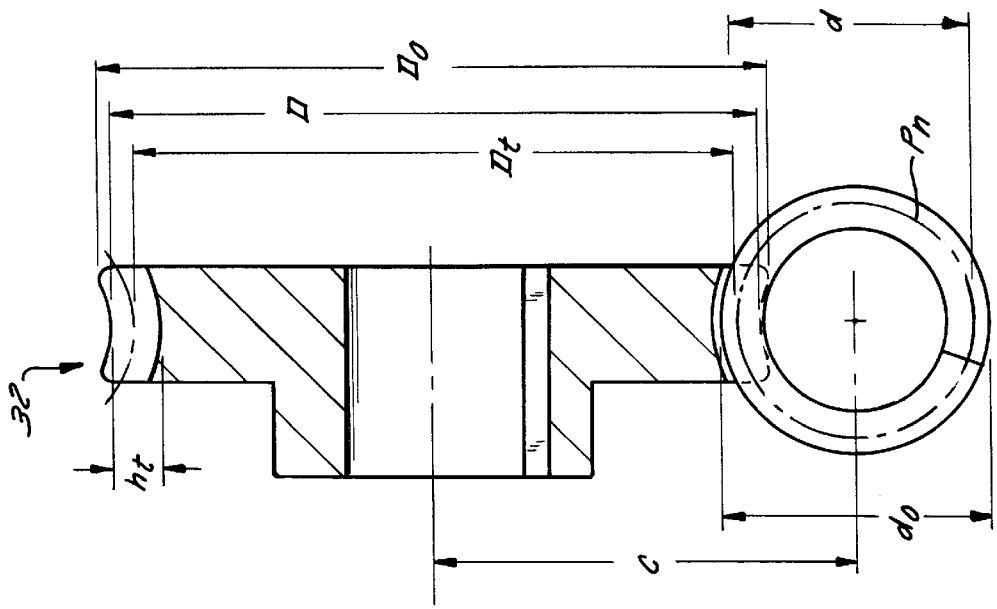
FIGS. 6A–6B are a front elevation view and a sectional side elevation view, respectively, of a worm and worm gear incorporated in a motorized wheelchair according to the present invention.
Figure 6A:
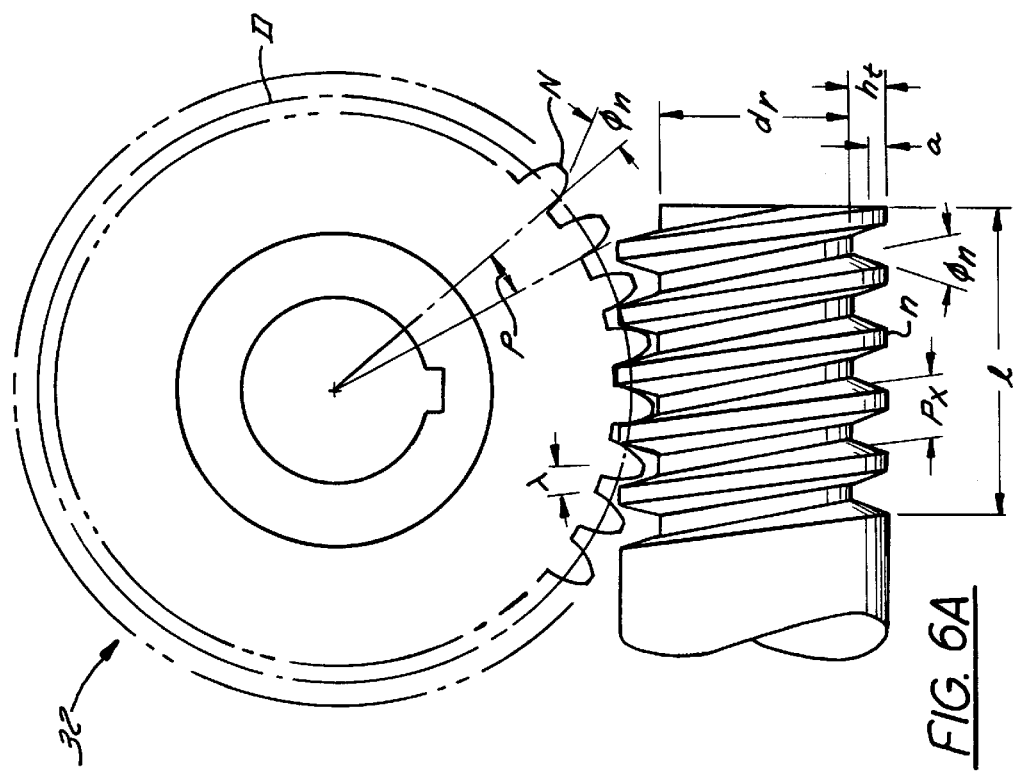

Referring now to FIGS. 6A–6B, particularly preferred embodiments of the worm 36 and worm gear 38 are illustrated. The worm 36 and worm gear 38 illustrated in FIGS. 6A–6B exhibit particularly favorable characteristics in terms of manual reverse mobility, efficiency, strength and speed transmission. The worm 36 and worm gear 38 illustrated in FIGS. 6A–6B have the following parameters:

TABLE I

Parameters of Worm

| Parameter | Dimension |
| --- | --- |
| Axial Pitch ($P_x$) | 0.1459898" |
| Number of Threads (n) | 5 |
| Outside Diameter of Profile ($d_o$) | 0.616" |
| Normal Pressure Angle ($\phi_n$) | 20° |
| Pitch Diameter (d) | 0.5313" |
| Lead Angle at Pitch Diameter ($\lambda$) | 23.6234 L. Hand |
| Lead (l) | 0.7299" |
| Addendum (a) | 0.0426" |
| Whole Depth ($h_t$) | 0.0957" |
| Root Diameter ($d_r$) | 0.425" |
| Operating Center Distance (C) | 1.195" |

TABLE II

Parameters of Worm Gear

| Parameter | Dimension |
| --- | --- |
| Axial Pitch (P) | 0.1459898" |
| Pitch Diamater (D) | 1.859" |
| Number of Teeth (N) | 40 |
| Normal Pressure Angle ($\phi_n$) | 20° |

TABLE II-continued

Parameters of Worm Gear

| Parameter | Dimension |
|---|---|
| Operating Center Distance (C) | 1.195" |
| Whole Depth of Tooth ($h_t$) | 0.0957" |
| Outside Diameter of Throat ($D_t$) | 1.9463" |
| Outside Diameter ($D_o$) | 1.977" |
| Lead Angle at Pitch Diameter | 23.6234° |

Many other changes and modifications may be made to the present invention without departing from the spirit thereof. For example, a single motor and worm gear assembly could be used to drive both wheels with the aid of an appropriate differential. The present invention could also be used in other types of motorized medical mobility apparatus other than motorized wheelchairs, such as in medical mobility scooters. The scope of these and other changes will become apparent from the appended claims.

I claim:

1. A worm gear assembly for a medical mobility apparatus, the worm gear assembly comprising:
    a worm, said worm being adapted to be operatively coupled to a motor shaft of a drive motor of said medical mobility apparatus;
    an intermediate shaft;
    a worm gear, said worm gear being disposed on said intermediate shaft, and said worm gear being adapted for being driven by said worm and being adapted for driving a drive wheel of said medical mobility apparatus,
        wherein said worm gear and said worm have a gear ratio of less than 10:1 and said worm has a lead angle in the range of about 20–30° so as to permit said worm gear to selectively drive said worm and so as to permit manual reverse mobility of said medical mobility apparatus without disengaging any part of the worm gear assembly.

2. A worm gear assembly according to claim 1, wherein the efficiency of said worm and said worm gear is at least 90% when said worm is driving said worm gear at a speed of about 3000 revolutions per minute.

3. A worm gear assembly according to claim 1, wherein said worm and said worm gear have a center distance in the range of about 1.0 inches to 1.5 inches.

4. A worm gear assembly according to claim 1, wherein said worm gear and said worm have a gear ratio of 8:1.

5. A worm gear assembly according to claim 1 wherein, so as to permit said worm gear to selectively drive said worm and so as to permit manual reverse mobility of said medical mobility apparatus,
    said worm gear and said worm have a gear ratio of 8:1 and an operating center distance of 1.195 inches,
    said worm has an axial pitch of 0.1460 inches, five threads, an outside diameter of a profile of 0.616 inches, a normal pressure angle of 20 degrees, a pitch diameter of 0.5313 inches, a lead angle of 23.62 degrees, a lead of 0.7299 inches, an addendum of 0.0426 inches, and a whole depth of 0.0957 inches, a root diameter of 0.425 inches, and
    said worm gear has an axial pitch of 0.1460 inches, a pitch diameter of 1.859 inches, forty teeth, a normal pressure angle of 20 degrees, a whole depth of a tooth of 0.0957 inches, an outside diameter of a throat of 1.946 inches, and an outside diameter of 1.977 inches.

* * * * *